Sept. 23, 1969     C. W. VOGT     3,468,099
CURTAIN DEPOSITING APPARATUS
Filed Jan. 25, 1966
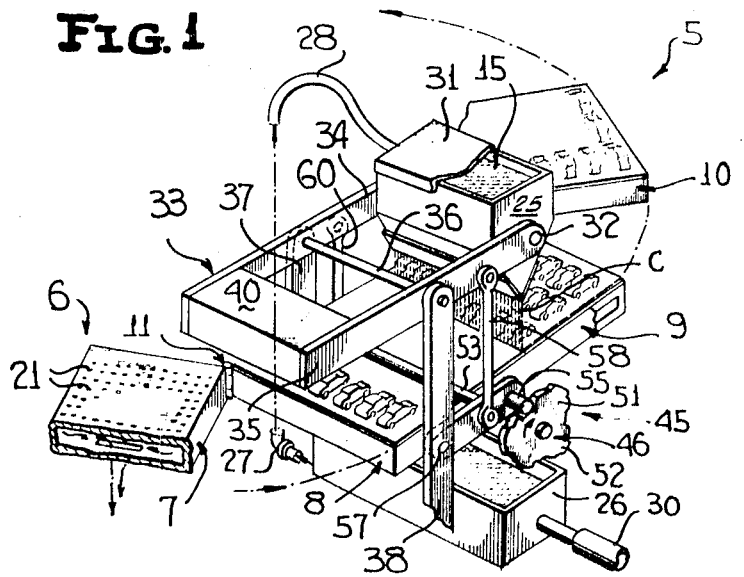
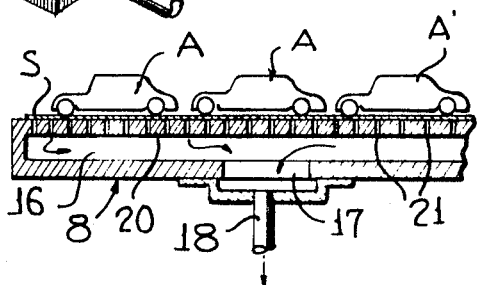
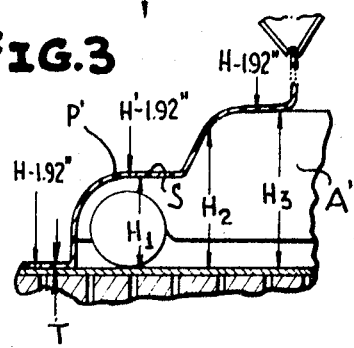
INVENTOR
CLARENCE W. VOGT
BY Mason, Porter, Diller & Brown
ATTORNEYS United States Patent Office 3,468,099
Patented Sept. 23, 1969

3,468,099
CURTAIN DEPOSITING APPARATUS
Clarence W. Vogt, Box 232, Westport, Conn. 06880
Filed Jan. 25, 1966, Ser. No. 522,895
Int. Cl. B65b 37/04
U.S. Cl. 53—140                                                14 Claims

ABSTRACT OF THE DISCLOSURE

In curtain coating apparatus, the length of the falling curtain of coating material is kept constant by moving the curtain forming orifice up or down in accordance with the variations in the contour of the article being coated as the article moves through the falling curtain.

---

This invention relates in general to new and useful improvements in apparatus for forming a freely falling curtain of web forming material and depositing the curtain upon a variably contoured surface while maintaining the thickness of the curtain unvaried irrespective of the variable surface contours.

This invention particularly relates to a novel apparatus wherein a plurality of articles are packaged or a continuous pocketed web is formed and, irrespective of the surface contours of the articles or pockets, means are provided for maintaining the thickness of the curtain constant and unvaried.

A primary object of this invention is to deposit a curtain of web forming material upon a variably contoured surface of a moving element while maintaining constant and uniform curtain thickness by providing means for moving an element along a predetermined path, means above the predetermined path for delivering a flowing curtain of web forming material of a predetermined length and thickness against the element, means for maintaining the length of the curtain substantially constant whereby the thickness of the curtain remains unvaried irrespective of the varying contours of the element, the maintaining means including means altering the distance between the delivering means and the predetermined path, and means for controlling the altering means in dependence upon the movement of the element along the predetermined path.

Another object of this invention is to provide a novel apparatus of the foregoing type wherein the moving means is a conveyor, and the element is a pocket portion of the conveyor opening toward the delivering means.

Still another object of this invention is to provide a novel apparatus of the type heretofore described in which the moving means is a conveyor, and the element is an article supported by the conveyor and movable therewith along the predetermined path.

A further object of this invention is to provide a novel apparatus for packaging a plurality of articles having contoured surfaces by providing conveyor means for moving a plurality of articles positioned upon a porous substrate seated upon the conveyor, the conveyor including a vacuum chamber for drawing air through the porous substrate, means above a portion of the conveyor for delivering a flowing curtain of web forming material of a predetermined length and thickness against the articles, means for maintaining the length of the curtain substantially constant whereby the thickness of the curtain remains unvaried irrespective of the varying contours of the articles, the maintaining means including means for altering the distance between the delivering means and the predetermined path while maintaining the distance between the delivering means and the articles substantially constant, and means for controlling the altering means in dependence upon the movement of the articles along the predetermined path and the surface contours of the articles.

A further object of this invention is to provide a novel apparatus of the immediately foregoing type wherein the maintaining means includes means for moving the delivering means toward and away from the predetermined path and the articles in a generally vertical plane, and the controlling means includes cam means operatively coupled to the delivering means for moving the delivering means in dependence upon the contours of the articles and the movement thereof along the predetermined path.

A further object of this invention is to provide a novel method of depositing a curtain of web forming material upon a variably contoured moving surface while maintaining constant and uniform curtain thickness comprising the steps of moving a variably contoured surface along a predetermined path, delivering a flowing curtain of web forming material of a predetermined length and thickness against the surface, and maintaining the length of the curtain substantially constant by varying the position of the curtain in dependence upon the surface configuration and the movement thereof along the predetermined path.

With the above and other objects in view that will hereinafter appear, the nature of the invention will be more clearly understood by reference to the following detailed description, the appended claims and the several views illustrated in the accompanying drawings:

In the drawings:

FIGURE 1 is a schematic fragmentary perspective view showing one form of an apparatus in accordance with this invention, and illustrates a curtain of web forming material being deposited against a plurality of articles supported by one of a plurality of vacuum platens of a conveyor.

FIGURE 2 is an enlarged fragmentary sectional view of one of the vacuum platens, and illustrates the articles supported upon a porous substrate and air being drawn by the vacuum platen through the porous substrate.

FIGURE 3 is a highly enlarged fragmentary view partially in side elevation and partly in cross-section, and illustrates a constant and unvaried curtain thickness as the curtain is being deposited upon one of the articles of FIGURE 2.

FIGURE 4 is a schematic fragmentary perspective view of another apparatus constructed in accordance with this invention, and illustrates a curtain of web forming material being deposited against the interior of a plurality of trays supported by one of a plurality of platens of a conveyor.

Referring now to the drawing in detail, it will be seen that there is illustrated in FIGURE 1 of the drawing a first form of apparatus in accordance with this invention, the apparatus being generally referred to by the reference numeral 5. The apparatus 5 includes a conveyor, generally referred to by the reference numeral 6, which is formed of a plurality of identical vacuum platens 7 through 10, etc. The vacuum platens 7 through 10 are joined to an endless conveyor chain (not shown) which defines a generally elliptical path of travel in the direction of the unnumbered headed arrows in FIGURE 1 of the drawing. The endless conveyor chain (not shown) is driven by suitable conventional means (not shown) such as a conventional motor and drive transmission means. Adjacent corners (unnumbered) of the vacuum platens 7 through 10, etc., are hingedly connected by conventional hinge means, such as the hinge means 11 between the platens 7 and 8.

The conveyor mechanism 6 moves the platens 7 through 10, etc., along the predetermined path in such a manner that trailing platens, such as the platen 7, swing about their associated hinge connections 11 and move into abutting relationship with adjacent platens, such as the platen 8, as the platens move toward and beyond a delivering mechanism, generally referred to by the reference numeral 15. Once beyond the delivering mechanism 15, the leading platens, such as the platen 10, swing away from trailing platens, such as the platen 9. This operation of the conveyor mechanism 6 permits the vacuum platens 7 through 10, etc., to pass beneath the delivering mechanism 15 in an unbroken path, as is graphically illustrated by the platens 8 and 9 of FIGURE 1.

Each of the vacuum platens 7 through 10, etc., is identical and, as is best illustrated in FIGURE 2 of the drawings, includes a vacuum chamber 16 placed in fluid communication with a vacuum source (not shown) such as a conventional vacuum pump, by means of a port 17 and a flexible tubular conduit 18. The vacuum chamber 16 is defined in part by an upper plate 20 provided with a plurality of orifices or apertures 21 (FIGURES 1 and 2).

A porous substrate S, such as a porous sheet of paperstock or plastic material, is placed upon the upper plate 20 of each of the platens prior to the hinging movement thereof into abutting relationship, and subsequent to the movement of the vacuum platens beneath the delivering mechanism 15. A plurality of elements or articles A are uniformly positioned upon the porous substrate S. In the illustrated embodiment of the invention, the articles A are toy automobiles grouped in three rows with identical spacing between the rows and between each article of each row of articles.

The curtain delivering mechanism 15 includes a tank 25 which is mounted above the predetermined path defined by the conveyor mechanism 6, and from which flows a vertical curtain C of plastic web-forming material, such as polyethylene. The tank 25 is preferably a sealed and insulated tank, and is supported for pivotal and vertical movement in a manner to be described more fully hereafter.

A collection box 26 is disposed in vertical alignment with the tank 25. The purpose of the collection box 26 is to receive web forming material flowing from the tank 25 and not utilized in the formation of the web or curtain C, and for replenishing the supply of additional material to replace material used in forming the curtain C. A suitable pump 27 is provided for returning the curtain forming material from the collection box 26 to the tank 25 by means of a flexible conduit 28. The curtain forming material disposed within the collection box 26 is continuously resupplied from a conventional extruder (not shown) by means of an insulated conduit 30. The curtain material is maintained at a desired predetermined temperature by means of suitable heaters (not shown) and the tank 25 is preferably internally pressurized by means of the pump 27. Suitable means (not shown) such as a valve is secured to a cover 31 of the tank 25 for removing entrapped air and other gases.

The tank 25 is supported for pivotal movement about a horizontal axis by means of a pair of trunnions 32 (only one of which is illustrated) and a yoke, generally referred to by the reference numeral 33, which includes a pair of arms 34, 35. The arms 34, 35 are supported for pivotal movement about a horizontal axis by means of a pivot pin 36 secured to upper end portions (unnumbered) of a pair of vertical frame members 37, 38. The frame members 37, 38 form a portion of the framework (unnumbered) of the apparatus 5 and are fixedly maintained in the vertical positions thereof illustrated in FIGURE 1 of the drawing. A counterweight 40 is fixed between the arms 34, 35 at end portions thereof remote from the tank 25.

A control mechanism, generally referred to by the reference numeral 45, is provided for moving the tank 25 in a vertical plane and in dependence upon the movement of the conveyor mechanism 6 and the articles A supported by the substrate S of the vacuum platens, in a manner which maintains the thickness of the curtain C constant and uniform irrespective of the varying contours of the articles A, as will be more fully apparent hereafter. The mechanism 45 includes a cam 46 having three identical contoured lobes 51–53 which correspond in outline generally to the outline of the articles A, as is readily apparent by comparing FIGURES 1 and 2 of the drawing. The cam 46 is fixed to a shaft 50 which is suitably journalled for rotation in a portion of the framework of the apparatus 5. The shaft 50 is rotated in synchronism with the movement of the conveyor mechanism 6 as, for example, by conventional gearing arrangements coupling the shaft 50 to the drive means (not shown) of the conveyor mechanism 6. The drive ratio between the conveyor mechanism 6 and the cam 46 is such that for each complete rotation of the cam 46 one of the platens 7 through 10, etc. will pass under the curtain C, as will be apparent more fully hereafter.

The cam 46 operates a cam follower 55 secured to an arm 56 which is in turn pivotally mounted by a pivot pin 57 to the framework portion 38. A link 58 is connected between the arms 35, 56 by conventional pivot pins (unnumbered). An identical link 60, an arm corresponding to the arm 56, and a cam corresponding to the cam 46 fixed to the shaft 50 may, if desired, be connected to the far side of the apparatus 5 as viewed in FIGURE 1 of the drawing. However, vertical movement of the tank 25 in synchronism with the movement of the conveyor mechanism 6 can be readily achieverd by the single cam 46, the cam follower 55, the arm 56 and the connection of the latter with the arm 35 by the link 58.

During the time period between the instant the curtain C of web forming material leaves the tank 25 of the delivering mechanism 15 and the time the curtain C impinges against the substrate S or the articles A, the downward speed or rate of fall of the curtain C takes place under the influence of gravity, and the distance the curtain C falls during any particular time period is determined from the formula:

$$S = \tfrac{1}{2} GT^2$$

where:

S is the distance in feet,
G is the constant 32 ft./sec.$^2$, and
T is the time in seconds.

For example, within the first one-tenth second from the time the curtain leaves the tank 25 the curtain will thus fall a distance calculated as follows:

$S = \tfrac{1}{2} (32 \text{ ft.}/\text{sec.}^2 \times 12 \text{ in.}/\text{ft.}) (\tfrac{1}{10} \text{ sec.}^2)$
$S = (192 \text{ in.}/\text{sec.}^2)(\tfrac{1}{100} \text{ sec.}^2)$
$S = 1.92$ inches The actual distance and velocity of the curtain C is somewhat less than the above-calculated distance and velocity due to the air resistance, changes in particle adhesion, etc. However, at the end of any particular time period the curtain C falls a predetermined distance at a velocity which is readily determined, and for any distance or length of the curtain C, as measured between the point at which it impinges the substrate S or the articles A, the curtain thickness will be constant if the length of the curtain C remains unchanged. Thus, the apparatus 5 is operative to achieve uniform curtain thickness in accordance with the recognition that uniform curtain thickness can be achieved by maintaining unvaried curtain length or height during the operation of the apparatus 5.

For example, assuming the apparatus 5 and the components thereof are in the positions illustrated in FIGURE 1 of the drawing, and further assuming that the curtain C leaves the tank 25 at a distance or height (H) of 1.92 inches above the upper surface of the substrate S (FIGURE 3), the curtain C will be applied to the substrate S at a predetermined thickness T (FIGURE 3). At this point, the cam follower 55 of the mechanism 45 is positioned between the lobes 51, 53 of the cam 46 and the tank 25 is in the lowermost position thereof.

As the first of the articles A' (FIGURES 2 and 3) in the leading row of articles carried by the vacuum platen 8 approach the curtain C the thickness T thereof will remain unvaried and constant by the movement of the tank 25 away from the substrate S a distance equal to the height of that portion of the article A' directly beneath the falling curtain C. For example, if a leading portion P' of the article A' and the remaining articles in the first row of articles progressively increases in height ($H_1$) to 0.25 inch as measured from the upper surface of the substrate S and to a surface $s$ of the articles A', the leading portion of the cam lobe 53 progressively raises the cam follower 55 (FIGURE 1) and the link 58 a distance which progressively raises the tank 25 so that at any one instant the length of the curtain C between the tank 25 and the point of impingement of the curtain C on the surface $s$ of the article portion P' is 1.92 inches as indicated by the alphabetical character $H_1$ in FIGURE 3. Thus, by maintaining the height or length of the curtain C constant by moving the curtain C toward and away from the articles A' and the substrate S the thickness T of all portions of the curtain C may be maintained constant and uniform.

As the platen 8 continues its movement the height of the articles A' progressively increases at $H_2$ to a maximum height at $H_3$ after which the article height progressively decreases until the trailing end of the articles A' pass under the curtain C. During the entire passage of the articles A' beneath the curtain C the height H thereof is maintained an identical distance between the tank nozzle and the surface against which the curtain impinges. While the height or length of the curtain C between the tank 25 and the point of impingement remains unchanged, it is to be noted that the distance between the nozzle (unnumbered) of the tank 25 and the uppermost surface (unnumbered) of the plate 20 of the platens 7 through 10, etc., continually changes. For example, at the time the surface $s$ of the article A' of FIGURE 3 is directly beneath the curtain C the nozzle of the tank 25 is spaced from the upper surface of the substrate S a distance equal to $H'+H_1$. Thus, while the distance between the tank nozzle and the vacuum platens defining the predetermined path of travel varies, the length or height H of the curtain C remains constant.

During the time the curtain C is being applied against the articles A and A' the vacuum drawn in the chamber 16 performs the dual function of holding each of the substrates S upon the upper plates 20 of the platens and drawing the curtain C into intimate surrounding, engaging relationship with the coated portions of the articles A, A' and the upper exposed surface of the substrate S between the articles.

As was heretofore noted, the tank 25 is mounted for pivoting movement on the arms 34, 35 by means of the trunnions 32. At times it has been found desirable to effect tilting movement of the tank 25 in addition to or in lieu of the vertical movement imparted thereto by means of the mechanism 45 and the associated components in the manner heretofore described. Such tilting movement is desirable when the surface contours of the articles which are to be coated with the curtain C are of a relatively complicated or intricate configuration. In such a case another cam (not shown) is preferably fixed to the rod or shaft 53 and a follower (also not shown) is connected to the tank 25 at a point offset from the trunnions 32 in such a manner that movement of the cam follower will impart clockwise and/or counterclockwise pivoting movement to the tank 25 as desired, again depending upon the particular configuration of the articles and the formation of the cam.

Another apparatus constructed in accordance with this invention for forming a curtain of uniform thickness is illustrated schematically in FIGURE 4 of the drawing, and is generally referred to by the reference numeral 65. The apparatus 65 includes a conveyor, generally referred to by the reference numeral 66, which is formed of a plurality of identical vacuum platens 67 through 70, etc.

The vacuum platens 67 through 70 are joined to an endless conveyor chain (not shown) which defines a generally elliptical path of travel in the direction of the unnumbered headed arrows in FIGURE 4 of the drawing. The endless conveyor chain (not shown) is driven by suitable conventional means (not shown) such as a conventional motor and drive transmission means. Adjacent corners (unnumbered) of the vacuum platen 67 through 70, etc., are hingedly connected by conventional hinge means, such as the hinge means 71 between the platens 67, 68.

The conveyor mechanism 66 moves the platens 67 through 70, etc., along the predetermined path in such a manner that trailing platens, such as the platen 67, swing about their associated hinge connections 71 and move into abutting relationship with the adjacent platens, such as the platen 68, as the platens move toward and beyond a delivering mechanism, generally referred to by the reference numeral 75. Once beyond the delivering mechanism 75, the leading platens, such as the platen 70, swing away from trailing platens, such as the platen 69. This operation of the conveyor mechanism 66 permits the vacuum platens 67 through 70, etc. to pass beneath the delivering mechanism 75 in an unbroken path, as is graphically illustrated by the platens 68 and 69 of FIGURE 4. Each of the vacuum platens 67 through 70, etc., is identical and includes a vacuum chamber 76 placed in fluid communication with a vacuum source (not shown) such as a conventional vacuum pump, by means of associated ports 77 and flexible tubular conduits 78. The vacuum chamber 76 of each of the vacuum platens 67 through 70, etc., is defined in part by an upper plate 80 provided with a plurality of recesses 81. There are six such recesses associated with each of the platens, but more or less than this number may be formed in the upper plates 80. Each of the recesses 81 is in turn provided with a plurality of orifices or apertures 82 in both bottom and side walls (unnumbered) of the recesses 81.

A porous tray T' or similar container which is constructed of porous paperstock or plastic material is placed into each of the recesses 81 of the upper plate 80 of each of the platens prior to the hinging movement thereof into abutting relationship, and subsequent to the movement of the vacuum platens beneath the delivering mechanism 75.

The curtain delivering mechanism 75 includes a tank 85 which is mounted above the predetermined path defined by the conveyor mechanism 66, and from which flows a vertical curtain C' of plastic web-forming material, such as polyethylene. The tank 85 is preferably a sealed and insulated tank, and is supported for pivotal and vertical movement in a manner to be described more fully hereafter.

A collection box 86 is disposed in vertical alignment with the tank 85. The purpose of the collection box 86 is to receive web-forming material flowing from the tank 85 which is not utilized in the formation of the web or curtain C', and for replenishing the supply of additional material to replace material used in forming the curtain C'. A suitable pump 87 is provided for returning the curtain forming material from the collection box 86 to the tank 85 by means of a flexible conduit 88. The curtain forming material disposed within the collection box 86 is continuously resupplied from a conventional extruder (not shown) by means of an insulated conduit 90. The curtain material is maintained at a desired predetermined temperature by means of suitable heaters (not shown) and the tank 85 is preferably internally pressurized by means of the pump 87. Suitable means (not shown) such as a valve is secured to a cover 91 of the tank 85 for removing entrapped air and other gases.

The tank 85 is supported for pivotal movement about a horizontal axis by means of a pair of trunnions 92 (only one of which is illustrated) and a yoke, generally referred to by the reference numeral 93, which includes a pair of arms 94, 95. The arms 94, 95 are supported for pivotal movement about a horizontal axis by means of a pivot pin 96 secured to upper end portions (unnumbered) of a pair of vertical frame members 97, 98. The frame members 97, 98 form a portion of the framework (unnumbered) of the apparatus 65, and are fixedly maintained in the vertical positions thereof illustrated in FIGURE 4 of the drawing. A counterweight 100 is fixed between the arms 94, 95 at end portions thereof remote from the tank 85.

A control mechanism, generally referred to by the reference numerol 105, is provided for movement of the tank 85 in a vertical plane and in dependence upon the movement of the conveyor mechanism 66 and the trays T′ suported by the vacuum platens, in a manner which maintains the thickness of the curtain C′ constant and uniform irrespective of the varying depths of the trays T′, as will be more fully apparent hereafter. The mechanism 105 includes a cam 106 having three identical contoured recesses 111–113 which correspond generally in outline generally to the outline of the interiors of the trays T′, as is readily apparent in FIGURE 4 of the drawing. The cam 106 is fixed to a shaft 110 which is suitably journalled for rotation in a portion of the framework of the apparatus 65. The shaft 110 is rotated in synchronism with the movement of the conveyor mechanism 66, as for example, by conventional gearing arrangements coupling the shaft 110 to the drive means (not shown) of the conveyor mechanism 66. The drive ratio between the conveyor mechanism 66 and the cam 106 is such that for each complete rotation of the cam 106 one of the platens 68 through 70, etc., will pass under the curtain C′, as will be more apparent hereafter.

The cam 106 operates a cam follower 115 secured to an arm 116 which is in turn pivotally mounted by a pivot pin 117 to the framework portion 98 of the apparatus 65. A link 118 is connected between the arms 95, 116 by conventional pivot pins (unnumbered). An identical link 120, an arm corresponding to the arm 116, and a cam corresponding to the cam 106 fixed to the shaft 110 may, if desired, be connected to the far side of the apparatus 65 as viewed in FIGURE 4 of the drawings. However, vertical movement of the tank 85 in synchronism with the movement of the conveyor mechanism 66 can be readily achieved by a single cam 106, the cam follower 115, the arm 116, and the connection of the latter with the arm 95 by the link 118.

During the time period between the instant the curtain C′ of the web-forming material leaves the tank 85 of the delivering mechanism 75 and the time the curtain C′ impinges against the trays T′, the downward speed or rate of fall of the curtain C′ takes place in the manner and at the rate heretofore noted with respect to the apparatus 5 of FIGURE 1. That is, at the end of any particular time period the curtain C′ falls a predetermined distance and for any distance or free length of the curtain C′, as measured between the point at which the curtain leaves the tank 85 and the point at which it impinges the trays T′, the curtain thickness will be constant if the free length of the curtain C remains unchanged. Thus, the apparatus 65 is operative to achieve uniform curtain thickness by maintaining unvaried curtain length or height during the operation of the apparatus substantially identical to that heretofore described with respect to the apparatus 5 of FIGURE 1, and a further description thereof is deemed unnecessary for a complete understanding of this invention. However, it should be noted that as compared to the contouring of the cam lobes 51–53 of the apparatus 5 to the configuration of the articles A to achieve uniform length of the curtain C, it is the recesses (111–113) between the cam lobes (unnumbered) which are contoured to effect movement of the delivery tank 85 as each tray T′ passes through the curtain C′. For example, with the cam follower 115 positioned midway upon the lobe between the recesses 111, 113 the curtain C′ is in a plane substantially through the abutting faces of the vacuum platens 68, 69. As the platens move in the direction of the unnumbered headed arrow and the cam 106 rotates clockwise, the delivery tank 85 begins to progressively drop as the leading cam portion of the recess 111 approaches the cam follower 115. Upon further rotation of the cam 106, the follower bottoms against the lowermost portion of the recess 111 at which time the curtain progressively coats the bottom of the associated trays T′. The trailing walls of the trays T′ are coated as the cam follower 115 is raised by the trailing cam surface of the cam recess 111. This operation is repeated as each of the pairs of trays pass through the curtain C′ and, due to the continuous constant free length of the curtain C′, a uniform coating of the web-forming material is applied to each of the trays T′.

As was heretofore noted, the trays T′ are constructed from porous material and the web-forming material can thus be drawn down into each of the trays T′ as a vacuum is drawn in the chambers 76 of the respective platens through the associated port 77 and the flexible conduits 78.

At this time, it is also pointed out that it is preferable but not necessary, that the width of the curtains C and C′ be in excess of the width of the respective vacuum platens as measured normal to the direction of travel of the respective conveyors 6 and 66. By so forming the curtain of web-forming material, there will be an assurance that the resultant web or curtain C, C′ will be of the same width as the platens with excess material at each edge of the platens being severed and removed by suitable means (not shown).

It is also desirable to sever the curtains C, C′ between adjacent platens prior to the hinging separation of the platens as shown, for example, by the platens 9 and 10 of the apparatus 5. Unless otherwise provided for, the movement of the vacuum platen 10 away from the platen 9 could sever or tear the applied and solidified curtain and render the finally formed package commercially undesirable. To this end each of the apparatuses 5 and 65 preferably include a hot wire severing reel, generally referred to by the reference numeral 130 (FIGURE 4) which includes a pair of heated wires 131, 132 secured between a pair of arms 133 (only one of which is illustrated) to which is secured a shaft 134. The shaft 134 is rotated in synchronism with the movement of the conveyor mechanism 66 in such a manner that, for example, the heated wire 131 rotates into contact with the curtain C′ just prior to the separation of the platens 69, 70. The heated wire 131 thereby severs the coating C′ and permits the platens 69, 70 to separate in the absence of undesirable curtain tearing or rupture. Continued rotation of the reel 130 brings the heated wire 132 into contact with the curtain C′ just prior to the separation of the platens 68, 69, with the resultant separation of the curtain C′ just prior to the subsequent separation of the platens 68, 69. This operation of the reel 130 is continuous and thereby assures continuous separation of the set curtain C′ between adjacent vacuum platens during the operation of the apparatus 65, as well as the apparatus 5, although the severing reel 130 is not illustrated relative to the latter apparatus.

After the curtain C′ has solidified or "set" the individual now coated trays T′ can be filled manually or automatically with a desirable product from a filling apparatus (not shown) overlying the conveyor mechanism 66 downstream of the delivering mechanism 75. After being suitably filled a cover sheet may be manually or automatically applied to close the individual trays T′. The cover sheet or web (not shown) may be dispensed from a suitable roll (not shown) and secured to the curtain C′ by a heat seal type connection across the bridging portions (unnumbered) between the leading and trailing trays after which conventional severing means (not shown) may be provided for dividing the now packaged units into individual packages. If desired, groups of two or more packages may be severed and folded upon each other to form packages of varied volumes and configurations.

In the operation of the apparatus 5, as well as that of the apparatus 65, it is to be particularly noted that the free heights or lengths of the curtains C and C' remain unchanged relative to the varied contours of the articles A, A' or the contours of the trays or pockets T'. In each case, it is the constant and unvaried height or length of the curtains C, C' which effects a constant and unvaried thickness of the coatings applied against the articles A, A' and the trays T'. In addition, while a height of 1.92 inches has been referred to heretofore in describing the operation of the apparatus 5, it is to be understood that any height or length of the curtains C, C' may be employed in the practice of this invention so long as the heights are not so extreme as would result in curtain breakdown caused by excessive curtain thinning. As can be readily appreciated, it is highly desirable to have a relatively short curtain height between the nozzle and the application of the curtain, and it is equally desirable that the velocity at the point of impingement of the curtain with any object coated in accordance with this invention should be as close as possible to the horizontal speed of the surface being coated.

For example, referring again to the apparatus 5 and the curtain height H of 1.92 inches, the velocity of the curtain C and the end of the assumed $\frac{1}{10}$ second is 38.40 inches per second (calculated from the formula $V = V_0 + \frac{1}{2}GT$). Therefore, by maintaining the speed of the elements being coated and the speed of the curtain substantially identical at the time of impingement, any tendency for the curtain to thin even minute amounts is wholly eliminated and constant and unvaried film thickness is assured.

It is also to be understood that while uniform curtain length is maintained by the practice of each method heretofore described, it is also possible to effect pivoting or swinging movement of the delivering tanks 25, 85 to achieve compound motion which proves advantageous in connection with longitudinal profiles, particularly those having undercuts. That is, in addition to moving the tanks 25, 85 vertically to maintain constant free curtain length, the tanks may also be pivoted in accordance with this invention about the respective trunnions 32, 92 in either a clockwise or a counter-clockwise direction to effect a combined tilting and vertical up and down movement in any case in which simultaneous swinging and vertical movement is required. Such tilting apparatus is further disclosed in my copending application Ser. No. 487,182, filed Sept. 14, 1965, and now Patent No. 3,381,445.

It is also to be understood that while the nozzle opening of the tanks 25, 85 is of a uniform width, the nozzle opening of each tank can be provided with suitable means to increase or decrease the size of the openings as desired. Furthermore, by appropriate nozzle construction the curtains C, C' could be provided with parallel vertical thickened bead portions which would reduce any thinning of the curtains along the end walls of the trays T' or the size of the articles A, A'.

I claim:

1. Apparatus for depositing a curtain of web forming material upon a variably contoured surface of a moving element comprising orifice means for delivering a flowing curtain of web forming material in a vertical plane toward an initial point of impingement spaced from said orifice means, means beneath said orifice means for moving an element having a variably contoured surface at a constant linear velocity in a generally horizontal plane and through said curtain with major portions of said element disposed in planes both generally parallel and generally normal to said vertical plane whereby the succeeding points of impingement are located spatially different from said initial point of impingement as measured generally vertically relative to said horizontal plane, and means for maintaining a generally constant distance between said orifice means and said initial and succeeding points of impingement whereby the free-falling portion of said curtain remains unchanged although the distance between the horizontal plane and said orifice means may vary said maintaining means including means for moving said orifice means toward and away from the parallel surface portions of said element as the same moves past said orifice means thereby maintaining said constant distance, and said maintaining means further including means for rendering said orifice means generally stationary during the movement of said normal surface portions of said element past said orifice means.

2. The apparatus as defined in claim 1 wherein said orifice moving means includes means for pivotally supporting said orifice means about an axis above and normal to said straight line path of travel.

3. The apparatus as defined in claim 1 including vacuum means in alignment with and beneath said orifice means for creating a suction beneath said element to draw said curtain into intimate contact therewith.

4. The apparatus as defined in claim 1 including vacuum means carried by said moving means for creating a suction beneath said element to draw said curtain into intimate contact therewith.

5. The apparatus as defined in claim 4 wherein said maintaining means includes means contoured to the configuration of said element surface, and means connected to said orifice means and movable relative to said contoured means for moving said orifice means in dependence upon the configuration of said contoured means.

6. The apparatus as defined in claim 1 wherein said maintaining means includes means contoured to the configuration of said element surface, and means connected to said orifice means and movable relative to said contoured means for moving said orifice means in dependence upon the configuration of said contoured means.

7. The apparatus as defined in claim 6 wherein said moving means is a conveyor, said conveyor is defined by a plurality of hingeably interconnected chambers, said chambers each having an upper perforated supporting surface, and means for coupling a source of vacuum to said chambers for creating a suction to draw said curtain toward said surface.

8. The apparatus as defined in claim 7 wherein said contoured means is a cam, means for rotating said cam, and a cam follower defining said means movable relative to said cam.

9. The apparatus as defined in claim 1 wherein said moving means defines a straight line path of travel normal to the vertical plane of the falling curtain.

10. The apparatus as defined in claim 9 wherein said moving means is a conveyor having a perforated supporting surface, and a vacuum chamber beneath and in part defined by said perforated surface for creating a suction to draw said curtain toward said surface.

11. The apparatus as defined in claim 9 wherein said moving means is a conveyor, said conveyor is defined by a plurality of hingeably interconnected chambers, said chambers each having an upper perforated supporting surface, and means for coupling a source of vacuum to said chambers for creating a suction to draw said curtain toward said surface.

12. The apparatus as defined in claim 9 including vacuum means carried by said moving means for creating a suction beneath said element to draw said curtain into intimate contact therewith.

13. The apparatus as defined in claim 9 wherein said orifice moving means includes means for pivotally supporting said orifice means about an axis above and normal to said straight line path of travel.

14. The apparatus as defined in claim 9 wherein said maintaining means includes means contoured to the configuration of said element surface, and means connected to said orifice means and movable relative to said contoured means for moving said orifice means in dependence upon the configuration of said contoured means.

References Cited

UNITED STATES PATENTS

| | | | |
|---|---|---|---|
| 2,935,424 | 5/1960 | Glaus | 117—105.3 XR |
| 2,976,658 | 3/1961 | Kostur. | |
| 2,976,837 | 3/1961 | Glaus. | |
| 3,008,834 | 11/1961 | Wallis. | |
| 3,219,012 | 11/1965 | Stream. | |
| 3,299,195 | 1/1967 | Chenoweth et al. | 264—271 XR |

DAVID KLEIN, Primary Examiner

U.S. Cl. X.R.

117—102, 105.3, 120; 118—7, 323, 324; 264—238, 271